US008898923B2

(12) United States Patent
Nahum et al.

(10) Patent No.: US 8,898,923 B2
(45) Date of Patent: Dec. 2, 2014

(54) SYSTEM AND METHOD FOR SETTING MEASUREMENT FORCE THRESHOLDS IN A FORCE SENSING CALIPER

(71) Applicant: Mitutoyo Corporation, Kawasaki (JP)

(72) Inventors: Michael Nahum, Kirkland, WA (US);
Joseph D. Tobiason, Bothell, WA (US);
Casey E. Emtman, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 210 days.

(21) Appl. No.: 13/706,225

(22) Filed: Dec. 5, 2012

(65) Prior Publication Data

US 2014/0150570 A1 Jun. 5, 2014

(51) Int. Cl.
*G01B 5/14* (2006.01)
*G01D 21/02* (2006.01)
*G01L 1/00* (2006.01)

(52) U.S. Cl.
CPC . *G01D 21/02* (2013.01); *G01L 1/00* (2013.01)
USPC .......................................................... 33/810

(58) Field of Classification Search
USPC ............................. 33/706, 783, 810, 811, 812
See application file for complete search history.

(56) References Cited

U.S. PATENT DOCUMENTS

| | | | | |
|---|---|---|---|---|
| 4,229,883 A * | 10/1980 | Kobashi | ........................... | 33/784 |
| 4,399,613 A * | 8/1983 | Nishikata et al. | ................ | 33/784 |
| 4,736,313 A * | 4/1988 | Nishimura et al. | .............. | 33/819 |
| 5,479,720 A * | 1/1996 | Hellstrom et al. | ............... | 33/783 |
| 5,574,381 A | 11/1996 | Andermo et al. | | |
| 5,901,458 A | 5/1999 | Andermo et al. | | |
| 5,973,494 A | 10/1999 | Masreliez et al. | | |
| RE37,490 E | 1/2002 | Andermo et al. | | |
| 6,400,138 B1 | 6/2002 | Andermo | | |
| 7,530,177 B1 * | 5/2009 | Meichle et al. | .................. | 33/784 |
| 7,802,374 B1 * | 9/2010 | Chen et al. | ...................... | 33/784 |
| 2002/0100183 A1 * | 8/2002 | Matsumiya et al. | ............ | 33/783 |
| 2003/0047009 A1 | 3/2003 | Webb | | |
| 2014/0007445 A1 * | 1/2014 | Yang | ............................... | 33/811 |
| 2014/0150272 A1 * | 6/2014 | Emtman et al. | ............ | 33/558.04 |
| 2014/0150274 A1 * | 6/2014 | Emtman et al. | ................. | 33/810 |

* cited by examiner

*Primary Examiner* — G. Bradley Bennett
(74) *Attorney, Agent, or Firm* — Seed IP Law Group PLLC (57) ABSTRACT

An electrically powered caliper is provided which includes a scale member, a slider, a displacement sensor, a force sensing arrangement and a signal processing portion. The signal processing portion is configured to receive a force signal and indicate a respective force corresponding to the respective position of the slider. Force data is acquired comprising a plurality of respective forces corresponding to respective positions of the slider. The signal processing portion defines an acceptable measurement force range defined by at least a minimum force threshold that is determined such that it exceeds a compensation force corresponding to at least one force component included in the force signal that is independent of user variations of the measurement force. It may analyze acquired force data to identify pre-contact data, and set the minimum force threshold for a current measurement procedure based on that pre-contact data.

23 Claims, 6 Drawing Sheets

SYSTEM AND METHOD FOR SETTING MEASUREMENT FORCE THRESHOLDS IN A FORCE SENSING CALIPER

BACKGROUND

Various electronic calipers are known that use electronic position encoders. These encoders are generally based on low-power inductive, capacitive, or magnetic position sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In an electronic caliper the scale is generally affixed to an elongated scale member that includes a first measuring jaw and the readhead is affixed to a slider which is movable along the scale member and which includes a second measuring jaw. Thus, measurements of the distance between the two measuring jaws may be determined based on the signals from the readhead.

Exemplary electronic calipers are disclosed in commonly assigned U.S. Pat. Nos. RE37,490, 5,574,381, and 5,973,494, each of which is hereby incorporated by reference in its entirety. A prior art electronic caliper that is capable of measuring force is disclosed in U.S. Patent Publication No. 2003/0047009. As described in the '009 publication, one deficiency in the use of prior calipers is the variation in force which can be applied by the measuring jaws and the differences in measurement which can occur as a result. This is particularly true when a soft object is being measured, where the measurement of the object may be altered by one measurer applying a high level of force on the jaws of the caliper and thereby partially indenting the soft object, while another measurer applies a low level of force such that the soft object is not indented. As a solution, the '009 publication discloses a caliper that is capable of measuring both the size and force applied to an object. However, while the caliper of the '009 publication does take force measurements, it does not determine and indicate an appropriate level of force that should be applied in order for accurate measurements to be obtained. Furthermore, it suggests that a size may be measured when a predetermined pressure is applied, and the pressure and corresponding size may be reported, but this is not a mode of operation that the typical caliper user would find ergonomically or perceptually conventional or convenient, and therefore it would not be intuitively understandable. For example, a user expects a caliper position display (which has a minimal size and cannot display large of amounts of information simultaneously) to track the caliper slider position, not suddenly freeze at a particular pressure. As a further example, the '009 publication indicates that friction may affect a force reading, but does not suggest an ergonomically or perceptually convenient way of addressing this issue. A need exists for a method for establishing and indicating an appropriate level of force to be utilized for the measurement of an object with a caliper in an ergonomically convenient, and intuitively understandable manner.

DETAILED DESCRIPTION

An electrically powered caliper is provided which includes a scale member, a slider, a displacement sensor, a force sensing arrangement located on the slider and a signal processing portion. The scale member includes a first measuring surface to be located against a workpiece during a measurement, and the slider includes a second measuring surface to be located against the workpiece during a measurement. The displacement sensor is configured to provide a position signal responsive to changes in a position of the slider along the scale member. The force sensing arrangement is configured to provide a force signal responsive to changes in a measuring force exerted on a workpiece by a user through at least one of the first and second measuring surfaces during a measurement procedure. The signal processing portion is configured to receive the position signal and indicate a respective position of the slider along the scale member.

In accordance with one aspect, the signal processing portion includes at least a first operating mode wherein it is configured to receive a force signal and determine a respective force corresponding to the respective position of the slider. Force data is acquired comprising a plurality of respective forces corresponding to respective positions of the slider. The signal processing portion is further configured to define an acceptable measurement force range defined by at least a minimum force threshold that is determined such that it exceeds a compensation force corresponding to at least one force component included in the force signal that is independent of user variations of the measurement force. As used herein, the term compensation force does not imply particular signal processing. Rather, a compensation force is merely considered to include a force component in the force signal that is not necessarily transmitted as a force to the workpiece, and may therefore require compensating or adjusting force signals or force signal thresholds in some manner such that actual forces on the workpiece during measurement fall in a desired range.

In accordance with another aspect, in some embodiments, the minimum force threshold is a static threshold based on force calibration data stored in the caliper during one of factory assembly and a field calibration procedure comprising acquiring force data while the user moves the slider without exerting force on a workpiece. In one embodiment, the signal processing portion is configured to analyze the force data acquired while the user moves the slider to determine and set the minimum force threshold based on the analyzed force data. In one embodiment, the signal processing portion is configured to determine a compensation force based on the analyzed force data, and set the minimum force threshold based on that compensation force.

In accordance with another aspect, in some embodiments, the minimum force threshold is a dynamic threshold and the signal processing portion is configured to analyze the acquired force data during a current measurement procedure to identify pre-contact data, and set the minimum force threshold for the current measurement procedure based on that pre-contact data.

In some embodiments, the signal processing portion is configured to define a first acceptable measurement force range for exterior measurements, and a second acceptable measurement force range for interior measurements.

In accordance with another aspect, in some embodiments, the acceptable measurement force range is further defined by a maximum force threshold. In some embodiments, the maximum force threshold is a static threshold. In other embodiments, the signal processing portion is configured to define the maximum force threshold relative to the minimum force threshold.

In accordance with another aspect, in some embodiments, the signal processing portion is configured such that it analyzes the acquired force data during a current measurement procedure, and dynamically defines the maximum force threshold of the current measurement procedure closer to the minimum force threshold for relatively more compliant workpieces and farther from the minimum force threshold for relatively stiffer workpieces. For example, in one embodiment, it analyzes the acquired force data during a current measurement procedure to characterize a workpiece spring rate and defines the maximum force threshold of the current measurement procedure relative to the minimum force threshold based on the characterized workpiece spring rate.

In accordance with another aspect, in some embodiments, the caliper may comprise a force actuator located on the slider, the force actuator comprising a force spring rate spring having a dimension that is altered by a user to vary the measurement force. In some embodiments, the force spring rate spring has a spring rate of at most 6 N/mm and at least 0.25 N/mm. In some embodiments, the force sensing arrangement may comprise a deformable member and a strain sensor that senses a deformation of the deformable member, and the force actuator and the force sensing arrangement may be configured such that the deformation corresponds to the altered dimension of the force spring rate spring.

In accordance with another aspect, the caliper comprises a force status indicator controlled by the signal processing portion, wherein the signal processing portion is configured to analyze the acquired force data during a current measurement procedure in order to control the force status indicator, and a first state of the force status indicator indicates that a current respective measurement force must be increased to be within the acceptable measurement force range, and a second state of the force status indicator indicates that a current respective measurement force is within the acceptable measurement force range and a current respective indicated position of the slider is a valid workpiece measurement according to criteria used by the signal processing portion. When the acceptable measurement force range is further defined by a maximum force threshold, an excessive force state of the force status indicator that is distinct from the first and second states is provided to indicate that a current respective measurement force exceeds the acceptable measurement force range and must be decreased to be within the acceptable measurement force range. In accordance with another aspect, in some embodiments, the criteria used by the signal processing portion to control the state of the force status indicator includes a force reversal criteria, and when the analysis of the acquired force data indicates a force reversal has occurred according to the criteria, then a force reversal state of the force status indicator that is distinct from the first and second states and indicative that a current respective indicated position of the slider is not valid workpiece measurement persists until at least one of force altering operations and position altering operations are performed by the user to deactivate the force reversal state. In some embodiments, the signal processing portion is configured to use a display of the caliper to display user prompts to guide the user in performing the at least one of force altering operations and position altering operations needed to deactivate the force reversal state. In one particular embodiment, the first state of the force status indicator comprises no indicator light on, the second state of the force status indicator comprises an indicator light of a first color, the excessive force state of the force status indicator comprises an indicator light of a second color, and the force reversal state of the force status indicator comprises an indicator light that is blinking.

In accordance with another aspect, at least one force component of the compensation force may comprise a slider frictional force component which depends on the friction of the slider on the scale member. Alternatively or in addition, at least one force component may comprise a gravitational force component which varies according to the orientation of the caliper and the mass of a slider assembly that moves with the slider. In some embodiments, the caliper comprises an accelerometer, wherein an output from the accelerometer is utilized by the signal processing portion in a determination of the gravitational force component.

In some embodiments, the signal processing portion may be configured to provide at least two operating modes for the caliper. One of the two modes may be a normal operating mode (e.g. providing operation substantially as known for prior art commercial calipers wherein the user performs no special operations related to force measurements and force measurements need not be used for determining dimensional measurements.) Such a mode is suitable for relatively rigid workpieces, and the user need not be bothered with operations related to a measuring force in this case. Another of the two modes may be a force-controlled operating mode (e.g. providing operation wherein the caliper indicates a valid measuring force condition, or indicates a valid dimensional measurement corresponding to a valid measuring force condition.) The force-controlled operating mode may be called force mode, for short.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
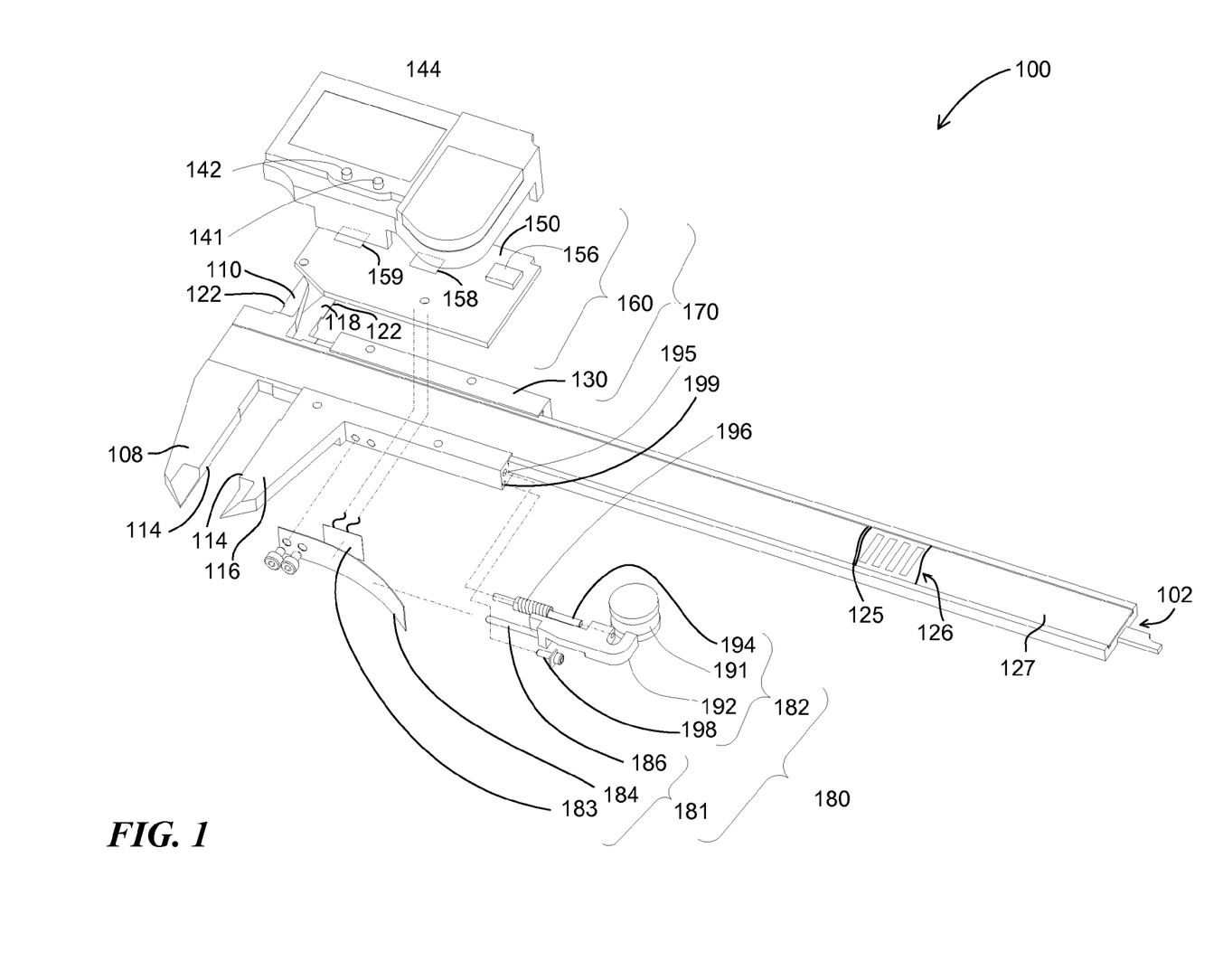
FIG. 1 is an exploded view diagram of a first exemplary embodiment of a hand tool type caliper with a single direction force sensor.

FIG. 1 is an exploded view diagram of a first exemplary embodiment of a hand tool type caliper 100 with a single direction force sensor. In this example, the caliper 100 comprises a magnetic or inductive sensor assembly 158 and a scale substrate 125 including a scale track 126 (a cut-away segment of each is illustrated) is positioned in a groove 127 along an elongated scale member 102. It will be appreciated that in other embodiments, other types of sensor assemblies 158 may be utilized (e.g. capacitive, etc.) A slider assembly 170 includes an electronic assembly 160 attached to a slider 130. The sensor assembly 158 is included in the electronic assembly 160. The general mechanical structure and physical operation of the caliper 100 is similar to that of certain prior electronic calipers, such as that of commonly assigned U.S. Pat. No. 5,901,458, which is hereby incorporated by reference in its entirety. The scale member 102 is a rigid or semi-rigid bar which may include various grooves and/or other features incorporated into a generally rectangular cross section. The scale substrate 125 may be rigidly bonded in the groove 127, and the scale track 126 may include scale elements that cooperate with corresponding elements (not shown) of the sensor assembly 158 included in the electronic assembly 160, in a manner similar to that used in known electronic calipers and as described in the previously incorporated U.S. Pat. No. RE37,490 and U.S. Pat. No. 5,901,458, and in commonly assigned U.S. Pat. No. 6,400,138, which is incorporated herein by reference in its entirety.

A pair of jaws 108 and 110 are integrally formed near a first end of the scale member 102. A corresponding pair of jaws 116 and 118 are formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 144, which is mounted within a cover 140 of the electronic assembly 160 of the caliper 100. The electronic assembly 160 may also include a push button switch 141 (e.g. an "origin" switch), a force status indicator 142 (e.g. a two or three color light), and a signal processing and display circuit board 150. As will be described in more detail below, the push button switch 141 may in one implementation be utilized as part of a process for setting force thresholds, and the force status indicator 142 may be utilized for providing force threshold signals (e.g. "green" when the force is within a desired measuring range, and "red" when the force has exceeded the desired measuring range.) The signal processing and display circuit board 150 may comprise an accelerometer 156 and a readhead signal processing and control circuit 159. As will be described in more detail below, in some embodiments an output from the accelerometer 156 may be utilized in the determination of at least one force component. In some embodiments, an output from the accelerometer may be utilized to determine when the caliper is not in a correct orientation for a valid force measurement, for which a warning signal may be provided to the user. As shown in FIG. 1, the bottom surface of the signal processing and display circuit board 150 may be mounted to abut the top surfaces of the slider 130 on either side of the scale member 102.

A force measuring assembly 180 is mounted to the slider 130. In this particular embodiment, the force measuring assembly 180 includes a force sensing arrangement, which in this particular embodiment is provided by a strain measuring assembly 181, and a force actuator assembly 182 in this particular embodiment. The strain measuring assembly 181 includes a strain sensor 183, a strain element 184 and a strain element actuator 186. The strain sensor 183 produces electrical signals that are indicative of the amount of strain put on the strain element 184 as it is bent by being engaged by the strain element actuator 186. The strain element actuator 186 is mechanically coupled to, or part of, the force actuator assembly 182. The force actuator assembly 182 includes a thumb wheel 191, a force actuator body 192, a guide rod/bearing 194, and an actuator force spring rate spring 196. As a user pushes on the thumb wheel 191 so as to move the slider 130 toward the first end of the scale member 102, the strain element actuator 186 is pushed forward so as to cause additional bend in the strain element 184, which the strain sensor 183 converts to electrical signals.

The actuator force spring rate spring 196 is located around the guide rod/bearing 194, which is received within a guide rod/bearing hole 195 of the slider 130. As a user pushes on the thumbwheel 191 so as to move the slider 130 toward the first end of the scale member 102, the actuator force spring rate spring 196 is compressed. As will be described in more detail below, the utilization of the actuator force spring rate spring 196 allows a more gradual increase or decrease in force to occur over a greater range of positions. Importantly, this results in more control and a better "feel" for a user when attempting to exert control to provide a desired amount of force during a measuring process.

Figure 2:
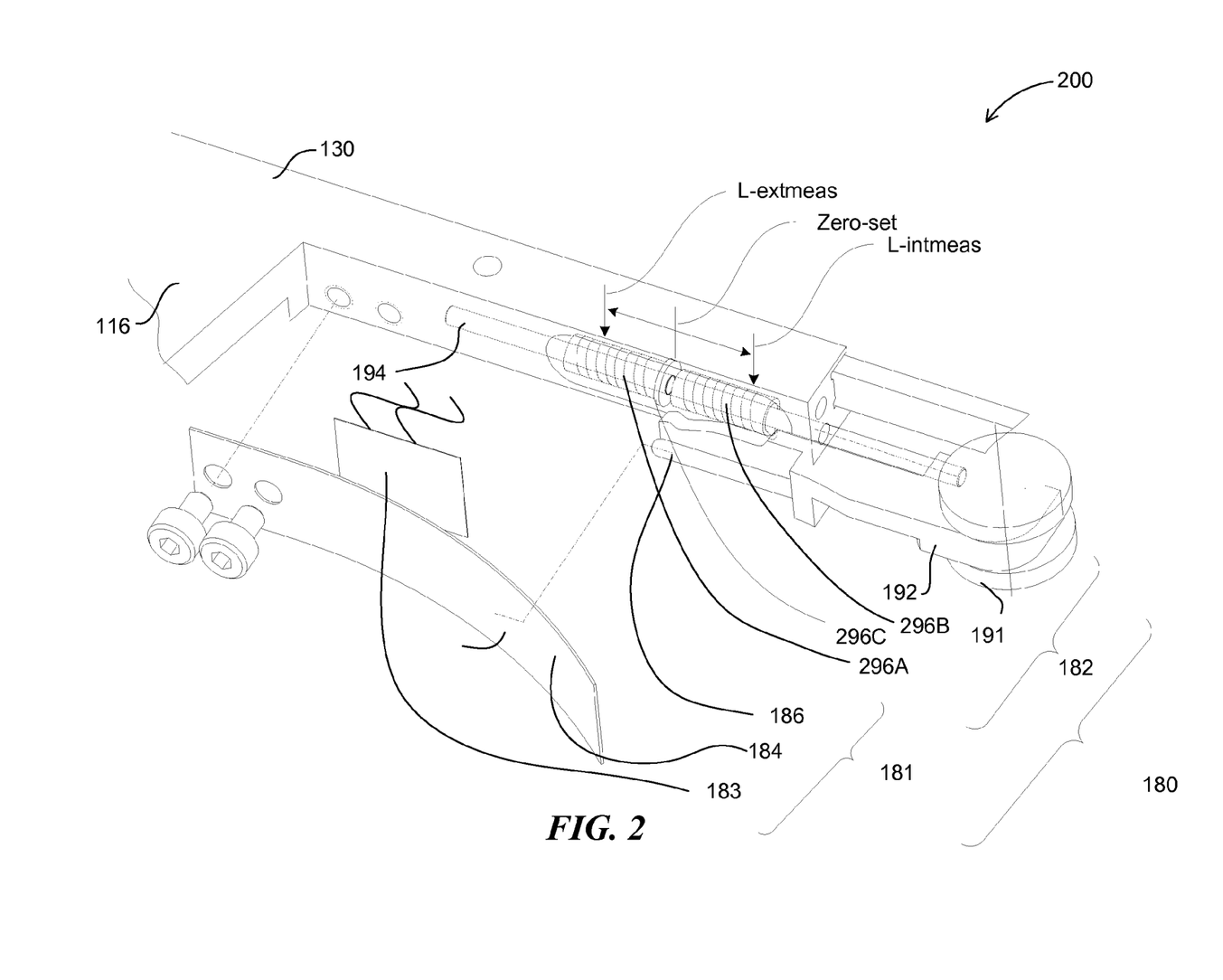
FIG. 2 is an exploded view diagram of a second exemplary embodiment of a hand tool type caliper with a bi-directional force sensor.

FIG. 2 is an exploded view diagram of a second exemplary embodiment of a hand tool type caliper 200 with a bi-directional force sensor. Otherwise, the caliper 200 may be similar to the caliper 100, and therefore only the significant differences are described with respect to FIG. 2. Certain portions of the caliper are omitted from FIG. 2 such that various components of the bi-directional force sensor may be more clearly illustrated.

A primary difference between the caliper 200 and caliper 100 is that the guide rod/bearing 194 is tethered between two portions 296A and 296B of an actuator force spring rate spring 296, which may also be two separate springs in some embodiments. As shown in FIG. 2, the two actuator force spring rate springs 296A and 296B are located around the guide rod/bearing 194, and abut a divider 296C (e.g., a C-clip ring) which is fixed to the guide rod/bearing 194. In this configuration, when a user pushes on the thumb wheel 191 so as to move the slider 130 toward the first end of the scale member 102, the actuator force spring rate spring 296A is compressed (e.g. for the measurement of the outside dimensions of a workpiece), similar to the operation for the actuator force spring rate spring 196 of FIG. 1. However, when a user moves the thumb wheel 191 in the opposite direction (i.e., so as to reverse the direction of the slider 130 toward the opposite end of the scale member 102), the actuator spring rate spring 296B is compressed (e.g. for the measurement of the inside dimensions of a workpiece.) In this manner, a bi-directional measurement configuration is achieved through the utilization of the spring rate springs 296A and 296B.

In one example configuration, the general operation of the caliper 200 may be described as follows. The caliper may begin at a position zero-set. At the position zero-set, the caliper is generally in the middle of the bi-directional measurement range, where the actuator force spring rate springs 296A and 296B are each biased approximately equally. The strain element 184 is also biased near the middle of its range at the position zero-set. As the user pushes the thumb wheel 191 so as to compress the spring rate spring 296A, a limit position L-extmeas may be reached. The limit position L-may correspond to an external measurement force limit (e.g. for measuring the external dimensions of a workpiece). For example, the compressed spring 296A may reach its solid height and prevent further deflection of the strain element 184 with increasing applied force, preventing meaningful force measurement. Similarly, when the thumb wheel 191 is moved by a user in the opposite direction, a limit position I-intmeas may be reached. The limit position I-intmeas may correspond to an internal measurement limit, (e.g. for measuring the internal dimensions of a workpiece.) In one implementation, the limit positions L-extmeas and I-intmeas may be determined according to when the springs 296A, 296B and/or 184 enter an undesirable range. The undesirable range may be defined by the springs either being relatively insensitive to force because they have approximately reached their solid height, or reaching a point where the output is becoming unacceptably non-linear. In one embodiment, in the absence of any other force limits having already been reached, the reaching of the limit positions L-extmeas or I-intmeas may produce and output from the strain element that triggers the activation of the "red" force status indicator light 142 (e.g. based on triggering limits implemented in the caliper signal processing) to indicate that the force has exceeded a desired measuring range.

It will be appreciated that while the bi-directional measurement configuration of FIG. 2 is illustrated as being achieved with the two actuator force spring rate springs 296A and 296B, other configurations may also be implemented. For example, in an alternative embodiment, a single actuator force spring rate spring may be utilized that is permanently attached at both ends. Such a configuration would allow the necessary forces to be achieved by pulling or pushing on the same spring. In one specific example illustration, where the measurement is of the outer dimensions of the workpiece, such a spring could be compressed 2-4 mm, with a force in the range 3 to 5 N. For the measurements of the internal dimensions of a workpiece the spring could be stretched 2-4 mm with a force in the range of 3 to 5 N. In general, with regard to such embodiments and/or the embodiment of FIG. 2, in certain specific implementations the inventor has determined that it may be desirable to use springs that have a rating of 0.25 N/mm to 6 N/mm, in order to provide certain ergonomic characteristics. It should be appreciated that while applying a controlled force when using a caliper, generally some fingers of a hand grip the caliper scale (thus fixing most of the hand relative to the caliper), a finger may also wrap around the slider, and a thumb may move relative to the hand to adjust the force actuator relative to the slider. Thus, the convenient amount of thumb travel is limited, relative to the remainder of the hand. In general, the 0.25 N/mm limit ensures that a useful amount of force variation may be provided within a convenient and comfortable amount of thumb travel relative to the remainder of the hand, while the upper limit of 6 N/mm ensures that the force variation with a small motion of the thumb is not so great that the user finds it too sensitive for easy and stable control, even for workpieces which may deflect and/or creep under a measurement force. In other words, the inventor has found that this spring rate range provides a user with a desirable measurement feel. It will be appreciated that through the use of levers or gears or other known machine elements, the relationship between finger displacement and force may be changed such that other springs rates (e.g. in the range of 0.05 to 20 N/mm) may be used in other embodiments. In some embodiments, other spring types (e.g. a resilient polymer material) may be used to provide the force spring rate spring.

Figure 3:
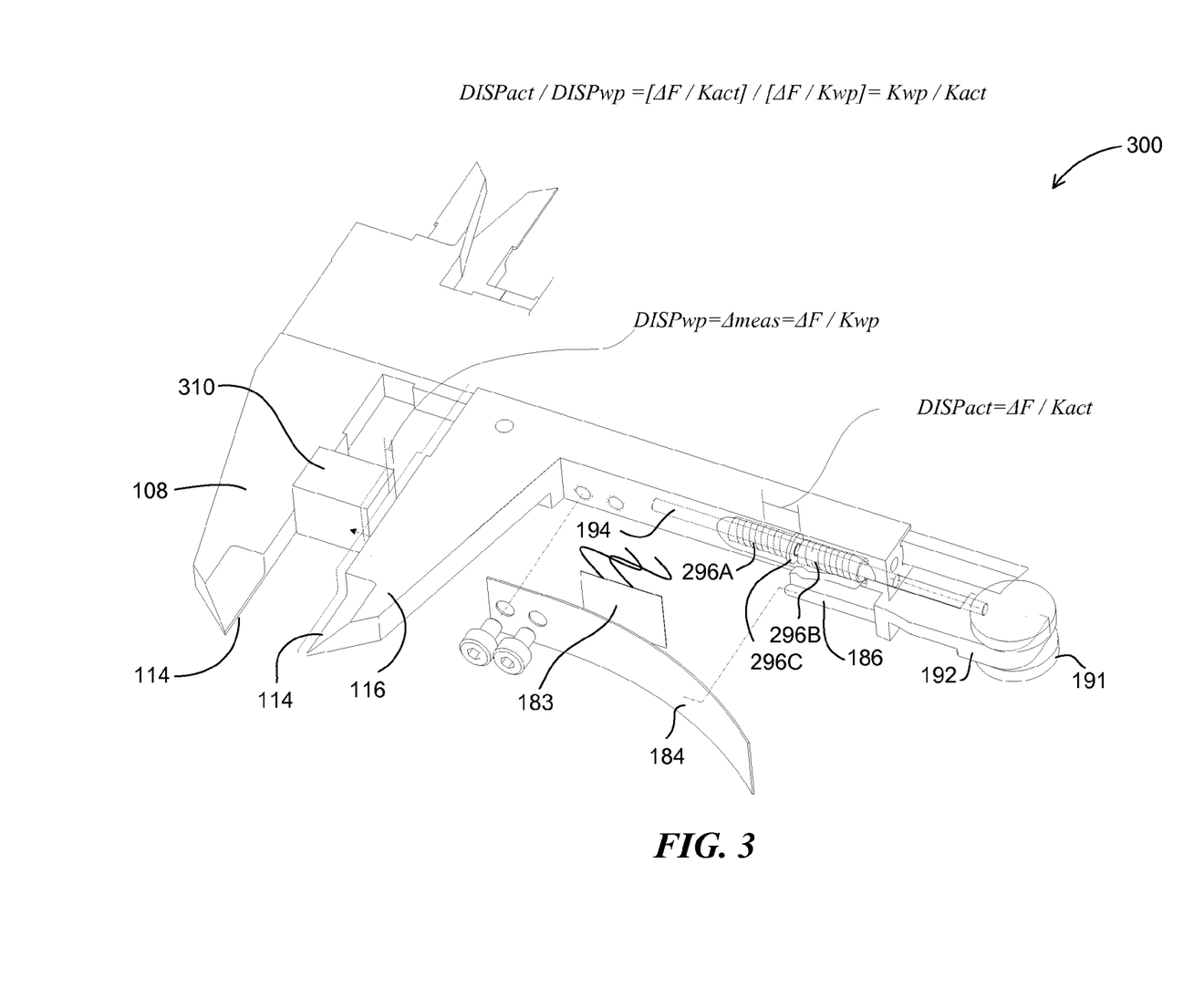
FIG. 3 is an exploded view diagram of the hand tool type caliper of FIG. 2 as measuring a workpiece with a spring rate that is expected to be higher than the spring rate of the actuator force spring rate springs.

FIG. 3 is an exploded view diagram of the hand tool type caliper of FIG. 2 as measuring a workpiece 310 that has a workpiece spring rate that is higher than the spring rate of the actuator force spring rate spring 296A. As indicated in FIG. 3, the workpiece 310 is engaged and/or compressed by the jaw 116 being moved toward the jaw 108. The amount of compression of the workpiece 310 is indicated by the dimension DISPwp, which indicates the amount of displacement of the workpiece as it is compressed. The corresponding movement of the actuator body 192 and compression of the actuator spring rate spring 296A (which provides the increment of force that provides the increment of compression of the workpiece) is indicated by the dimension DISPact. The following equations illustrate the various relationships between the dimensions, the applied force, and the respective spring rate constants.

$$DISPact = \Delta F/Kact \quad (Eq. 1)$$

$$DISPwp = \Delta meas = \Delta F/Kwp \quad (Eq. 2)$$

$$DISPact/DISPwp = [\Delta F/Kact]/[\Delta F/Kwp] = Kwp/Kact \quad (Eq. 3)$$

As indicated by Equation 1, the displacement in the actuator DISPact is equal to the delta force $\Delta F$ divided by the constant for the actuator spring Kact. As indicated by Equation 2, the displacement from the compression of the workpiece DISPwp is equal to the delta measurement $\Delta meas$, which is equal to the delta force $\Delta F$ divided by the constant for the compression of the workpiece Kwp. As indicated by Equation 3, the overall displacement of the actuator DISPact divided by the displacement from the compression of the workpiece DISPwp is equal to the spring rate constant for the compression of the workpiece Kwp divided by the spring rate constant for the compression of the actuator spring Kact.

From the above described relationships of Equations 1-3, in some embodiments it is desirable for the actuator springs 296A and 296B to have a spring rate that is lower than an expected workpiece spring rate (i.e. an actuator spring rate compression constant Kact that is lower than a workpiece spring rate compression constant Kwp.) For hard metallic workpieces, which are very stiff, a high force actuator spring rate or even a rigid force actuator may be acceptable because such workpieces do not compress significantly and the applied force need not be well controlled. However, this is not the case for compliant workpieces, which compress to a measurement dimension that depends on the applied measurement force. For such workpieces, the spring rate of the actuator springs 296A and 296B is important due to both measurement repeatability and ergonomic considerations. These are generally related to displacement tolerance for "thumb sensitivity" for a user's movement of the thumb wheel 191 as outlined above, to provide a relatively stable force with ergonomic ease. In other words, it is desirable to ensure that the movement of the thumb wheel 191 provides a user with an acceptable "measurement feel". As described above, in one specific example implementation, it may be desirable for the actuator force spring rate springs 296A and 296B to fall within a range between 0.25 N/mm to 6 N/mm (e.g., in one specific example implementation, a 0.6 N/mm spring provided an acceptable measurement feel).

Figure 4A:
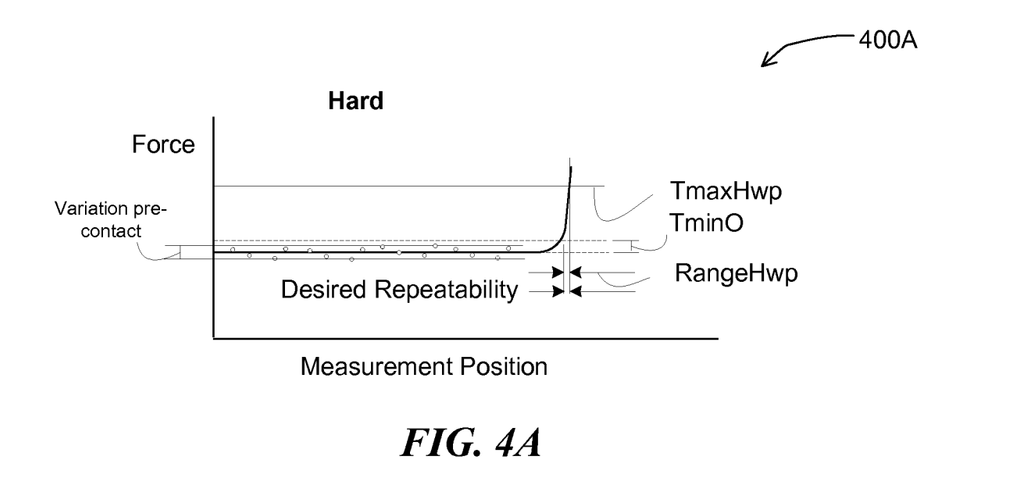
FIGS. 4A and 4B are graphs illustrating measurement data for a hard and soft workpiece, respectively.
Figure 4B:
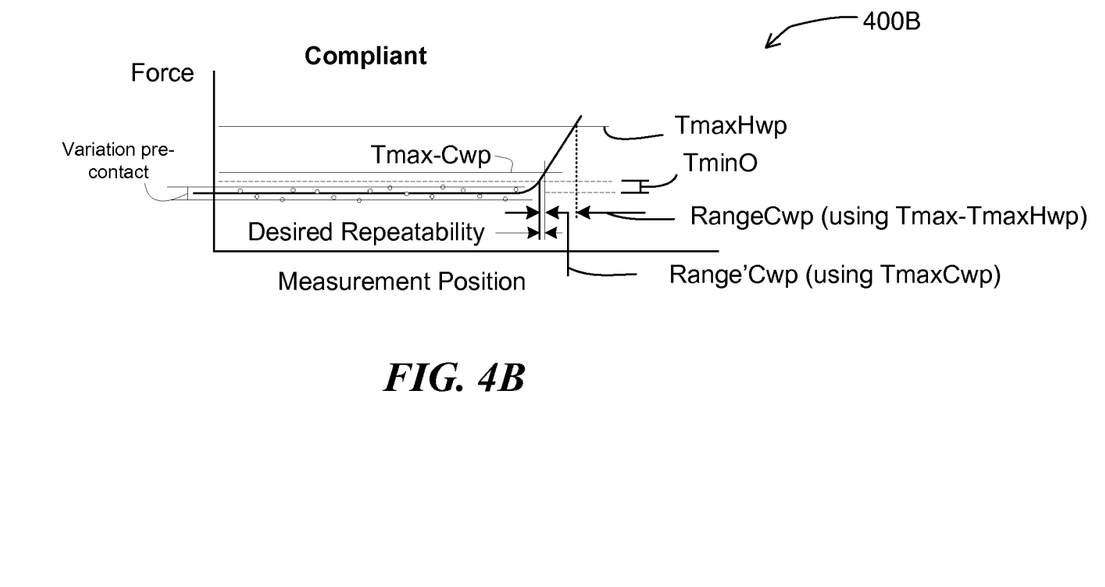

FIGS. 4A and 4B are graphs 400A and 400B illustrating measurement data and related considerations for a hard and soft workpiece, respectively. As described above with respect to FIG. 1, in certain implementations, a signal may be provided to a user to indicate when the measurement force reading has entered a desired range (e.g., a green light may be provided in the force status indicator 142 of FIG. 1 once a desired measurement force range has been entered). In addition, in some implementations, it may also be desirable to provide another indicator when too much force is being applied (e.g., a red light may be provided in the force status indicator 142 of FIG. 1 to indicate when too much force is being applied). In this regard, a minimum force threshold may be established (e.g., for triggering the green light) and a maximum force threshold may be established (e.g., for triggering the red light). As indicated in FIG. 4A, a minimum force threshold TminO may be set, in some embodiments, at a level above the pre-contact variation in the force measurement data points, which occur prior to the contact with the workpiece, and are generally representative of the frictional force of the slider (and in some cases, gravitational forces). The maximum force threshold TmaxHwp may be set at a level that is within the force sensing range of the caliper and indicates the upper limit of an acceptable force level wherein expected "hard" workpieces are not excessively deformed. A dimension RangeHwp indicates the measurement position difference between a measurement at the minimum force threshold TminO and a measurement at the maximum force threshold Tmax-Hwp. In general, for a hard workpiece (that is, a high spring rate workpiece) such as that illustrated for FIG. 4A, Tmax may be set relatively high to provide a broad range for acceptable measuring force, and any force between Tmin and Tmax may still produce a measurement within a desired repeatability range DRep (e.g. within 1-2 LSB of the measurement, or less, in some embodiments.) In contrast, as will be described in more detail below with respect to FIG. 4B, for a soft (i.e., compliant) workpiece, a different Tmax may need to be utilized in order to achieve a similar desired repeatability DRep for measurements.

As shown in FIG. 4B, the slope of the force curve once contact is made with the workpiece is significantly different for a compliant workpiece than it is for the hard workpiece illustrated for FIG. 4A. In other words, due to the lower spring rate and the more gradual slope in the force curve, if the maximum force threshold Tmax-Hwp is left at the same level that was utilized for the hard workpiece of FIG. 4A, the workpiece may become significantly more compressed/deformed within the jaws of the caliper, such that the change in measurements due to force variations is more significant. As illustrated in FIG. 4B, a dimension RangeCwp indicates the measurement position difference between a measurement at the minimum force threshold TminO and a measurement at the "hard workpiece" maximum force threshold TmaxCHwp. It may be seen that RangeCwp exceeds the desired repeatability DRep. In order to achieve the desired repeatability DRep that was achieved in FIG. 4A, a lower maximum force measurement threshold TmaxCwp may be utilized. By utilizing the lower maximum force threshold Tmax-Cwp, a more desirable repeatability Range'Cwp may be achieved, which approximately matches the desired repeatability DRep. Based on this description, it will be appreciated that in order to balance ease of use considerations with accuracy considerations, in some embodiments it may be advantageous for a force caliper to have at least two measurement modes having different maximum force criteria, suitable for hard and compliant workpieces, respectively. As will be described in more detail below with respect to FIGS. 5-6, various techniques may be utilized for setting the maximum force thresholds for soft or compliant workpieces. It may appreciated that an acceptable measurement force range, as opposed to a single force level, may be preferred as a basis for indicating that a dimensional measurement is acceptable. In such as case, the user may apply various forces within the indicated acceptable (and/or unacceptable) range and observe the sensitivity of the changing measurement in the display in real time, and generally operate the caliper in a familiar and intuitively understandable manner in order to read a desirable measurement value.

Figure 5:
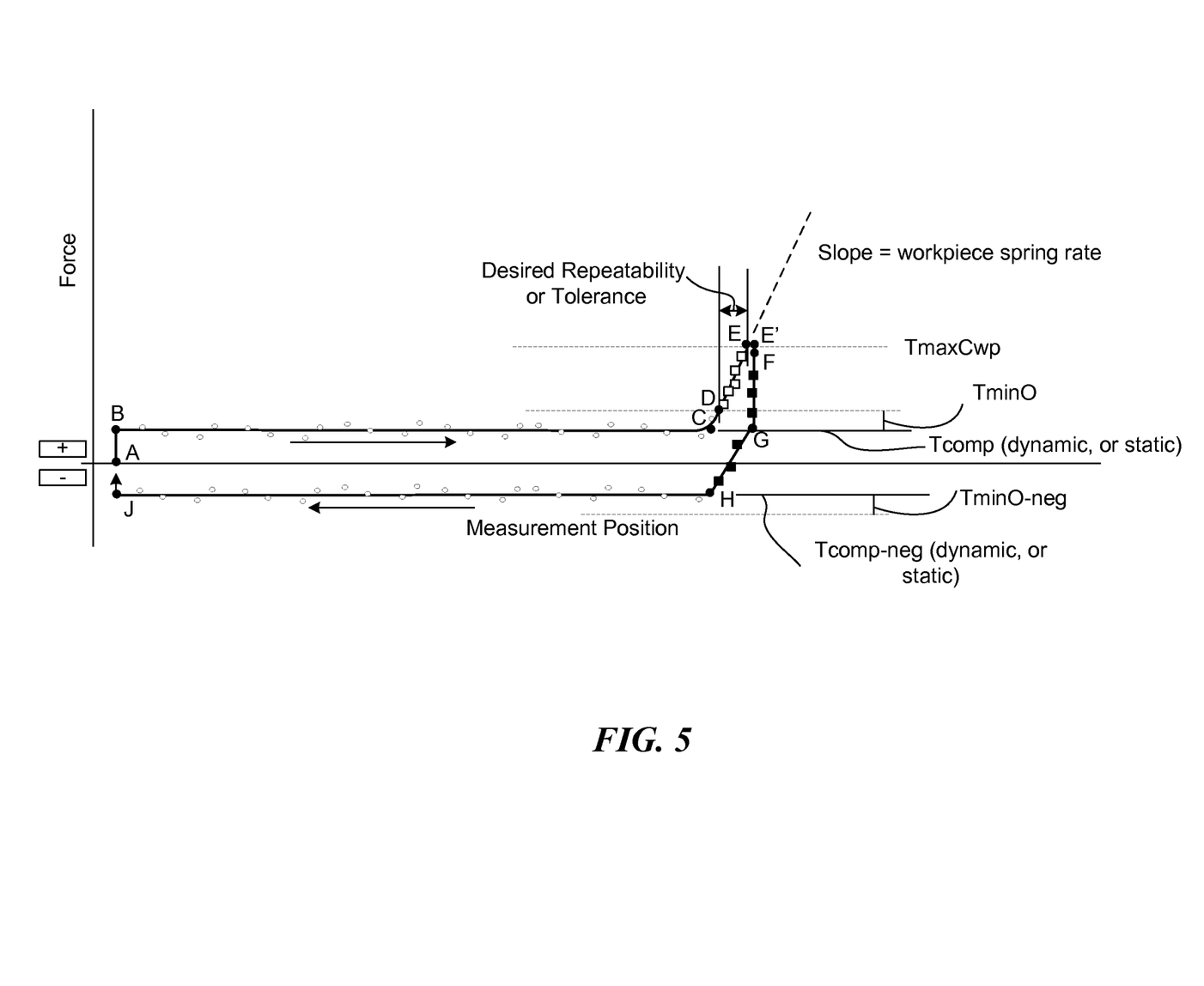
FIG. 5 is a graph illustrating measurement data and an associated calibration process for a soft workpiece.

FIG. 5 is a graph 500 illustrating idealized measurement data and related signal processing and operating considerations related to a relatively compliant workpiece. As illustrated in FIG. 5 at a point A, no force is applied, and the measurement position is at start position. As a user begins to exert force through an actuator (e.g. the force actuator assembly 182') to move the slider, the frictional force of the slider must initially be overcome, for which the graph moves to the point B. From the points B to C, the slider moves toward the workpiece, with the data points indicating the minor pre-contact variations in the force measurement readings, generally at an average level Tcomp, with the primary component being the frictional force of the slider, in this example. At the point C, contact with the workpiece is made, and the force increases. At point D, the force is increased to the threshold force value TminO, and an indicator of an acceptable measurement force range may be activated (e.g. a green light may be provided in the force status indicator 142 of FIG. 1). Between points D and E, the user may continue to compress the compliant workpiece against the jaws of the caliper by increasing the actuator force, causing the position reading to increase as the force is increased. At the point E, the force is increased to the threshold force value TmaxCwp, and an indicator of an unacceptable measurement force range may be activated (e.g. a red light may be provided in the force status indicator 142 of FIG. 1). Between the points E and E', the user does not increase the actuator force, but workpiece creep may occur in this particular example (i.e., the workpiece continues to compress, even when the force is held constant.)

Between the points E' and F, the user may begin to reduce the actuator force, which may not have an associated position change since this force reduction is still in a range that constitutes a "force relaxation" within the range of the friction force, without overcoming the friction force in the opposite direction. However, the force reduction without an accompanying displacement may be sensed at point F, which in some embodiments and/or particular cases may trigger a force reversal signal processing mode such as the embodiment described further below. Between the points F and G, the user may continue to reduce the actuator force, which may not have an associated position change until at point G, the friction force is overcome in the opposite direction, and the slider begins to move in the opposite direction. Between points G and H, the user may continue to reduce the actuator force and then provide an actuator force in the opposite direction (changing from a positive to negative force polarity) and the compliant workpiece in the jaws of the caliper begins to return to its original shape, causing the position reading to decrease as the actuator force is reduced. Assuming no residual "set" in the workpiece, at the point H the jaw leaves the workpiece and the slider moves toward point J with the user exerting a relatively consistent negative polarity force through the actuator (e.g. the force actuator assembly 182') to move the slider, with the data points indicating the minor pre-contact variations in the force measurement readings, generally at an average level Tcomp-neg, with the primary component again being the frictional force of the slider, in this example.

Several points not considered in relation to prior art force calipers may be considered in relation to FIG. 5. It should be appreciated that a first "force/displacement curve" is observed between the points C and E, and this curve depends partly on the history of motion of the slider (for example, point C is approached continuously from the left in the figure at the approximate force level Tcomp). In contrast, due to friction effects in this example, a second force/displacement curve is observed between the points E' (or F) and G, for approximately the same force range as between points C and E, such that at the force TminO, for example, two significantly different position measurements may be obtained from the first and second force/displacement curves. The potential difference between these position measurements may depend on a relationship between the friction forces (together, approximately equaling Tcomp plus Tcomp-neg in this particular example) and the spring rate of the compliant workpiece. In some cases, the difference may be larger than a desirable repeatability (e.g. for relatively more compliant workpieces and/or relatively high friction). Thus, it is desirable in some embodiments that the signal processing discriminates between these two force/displacement curves and not simply indicate an "acceptable measuring force" threshold or range" as the only basis for indicating a desirable workpiece measurement. For this and other reasons outlined below, in some embodiments the signal processing electronics may retain a history (e.g. a constantly updated sequence of a predetermined length, in one embodiment) of paired force and position data samples, and include a force reversal sensing and indicating routine.

The signal processing electronics may be configured to frequently analyze the history (e.g. at a frequency based on a time period, or an amount of motion, or both) and govern various operations based on that analysis. For example, in some embodiments the signal processing electronics includes a routine that detects that the threshold TminO is exceeded, and includes a "spring rate" determination routine that analyzes data "above TminO" wherein the force and position have a consistent relationship of force and position change between successive samples (e.g. both increasing as shown by the open square data points between D and E in FIG. 5) to determine the workpiece spring rate. Based on the workpiece spring rate, determined from data qualified as outlined above (e.g. above TminO for force and having a consistent relationship of force and position change), a desired repeatability or tolerance may be used to determine a desirable "automatically customized" upper force limit TmaxCwp for that particular workpiece spring rate, as indicated in FIG. 5. It will be appreciated that this may be done in real time (or nearly so), such that, even as a user compresses a new compliant workpiece, the indicator of an unacceptable measurement force range may be activated (e.g. a red light may be provided in the force status indicator 142 of FIG. 1) approximately when the automatically customized upper force limit TmaxCwp is exceeded, rather than using a fixed upper force threshold. In the illustrated example, the upper force limit TmaxCwp is set such that [(TmaxCwp)−(TminO)]*[Workpiece Spring Rate] =Desired Repeatability. Of course a fixed upper force threshold, or an upper force threshold at a fixed force amount relative to a dynamic or fixed TminO, or at an upper force threshold entered by a user, or a fixed field of factory calibrated or recalibrated threshold, may also be used in various other embodiments or operating modes of the force caliper, rather than a dynamic upper force limit as outlined above.

In some embodiments, the signal processing electronics may include a routine that detects that the threshold TminO is exceeded, and include a "force reversal" routine that monitors data above TminO for a change in an expected relationship of force and position change between successive samples. For example, by analyzing a plurality of successive data points between D and E (e.g. the open square data points in FIG. 5), the routine may determine a relationship wherein the force and position both change by significant amounts in a positive direction (or polarity) between samples. In contrast, between E' and F (and continuing to G), the force decreases significantly (the previous polarity of change is reversed) while the position does not change significantly as shown by the dark square data points between E', F and G in FIG. 5. Therefore, based on these differences, a routine may determine the reversed force change polarity between E' and F (and/or beyond) corresponding to the second force/displacement curve, and change the signal processing operations, and/or indications to the user, accordingly. Such a routine implements valid workpiece measurement criteria that must be satisfied in addition to the simple criteria of the force signal being in the acceptable force range, in order to indicate a valid measurement condition using the force status indicator. In some embodiments, the criteria of the force reversal routine may include consideration of a determined workpiece spring rate, and/or a desired repeatability, and/or an amount of friction or compensation force, and/or the amount of apparent compression of a workpiece prior to reversal, according to principles outlined above. Thus, in some embodiments, the force reversal criteria may cause force reversal indications to be displayed for force reversals during some workpieces and/or measurement procedures, and not others.

It will be appreciated that if TmaxCwp is not exceeded prior to a force reversal, it may not be necessary to change the signal processing operations, and/or indications to the user, because position readings may still be within the desired repeatability or tolerance limits. However, in this case the actual repeatability may be degraded somewhat by failing to distinguish between measurements on the first and second force/displacement curves. In contrast, as one may see with reference to FIG. 5, if the force has exceeded TmaxCwp, then along the second force/displacement curve the force range indicator should not necessarily be switched back to acceptable (e.g. green) based simply on the force returning below TmaxCwp. For example, for a compliant workpiece, depending on the amount of friction, as illustrated in FIG. 5, the corresponding "invalid force range" dimension corresponding to the vertical line between E' and G may persist despite the force reading returning below TmaxCwp (e.g. in the "valid force range" between the points F and F'.) Therefore, in some embodiments the signal processing electronics may include a routine that detects that the threshold TmaxCwp is exceeded, turns on the "out of range" indication, and includes a "force reversal" routine that suppresses the "within range" indication (e.g. the green indicator light), and/or indicates an error condition, and/or prompts the user to take certain actions, once the threshold TmaxCwp is exceeded for certain spring rates and/or friction forces, despite the force returning to the original "acceptable range" between TminO and TmaxCwp. For example, in one embodiment, a third color indication is provided (e.g. yellow) or a blinking light is activated when the force is reversed in this manner, and/or a prompt (e.g. an arrow) is provided in the caliper display indicating that the user should move the slider in a direction to achieve a position that allows a return to the first force/displacement curve (e.g. by moving in the direction of the arrow prompt). In one such embodiment, the first position reading along the first force/displacement path (e.g. the first data point above TminO) is specifically retained in memory, and when the position finally falls below this value, (e.g. at point H), a new prompt and/or indication (e.g. the indicator light going out and/or the arrow disappearing to leave a normal display, or the arrow reversing direction) indicates that the user may again move the slider to approach the workpiece and achieve a desirable measurement along the first force/displacement curve.

As mentioned above, the signal processing electronics may retain a history of paired force and position data samples, and frequently analyze the history and govern various operations based on that analysis. For example, in some embodiments the signal processing electronics includes a routine that detects that the position is changing by a significant amount, or changing rapidly, while the force does not change significantly (e.g. the last force change is less than an amount expected for a minimal spring rate in light of the last position change, or is not outside of a predetermined or recently analyzed force noise level, or friction level, or the like). This condition corresponds to the pre-contact data points shown between B and C in FIG. 5, or in another case between H and J in FIG. 5. Whenever this condition is fulfilled for a predetermined number of data points, the signal processing routine may compute an average value (or median, or maximum or other desired value) that is used for Tcomp (or Tcomp-neg, depending on the direction of motion). In such a case, the routine may also determine a noise threshold relative to Tcomp, or Tcomp-neg based on the scatter of the pre-contact data points (e.g. at 3 standard deviations, or just beyond the most extreme force data point, or the like.) In one embodiment, a dynamic value of TminO (and/or its opposite polarity counterpart TminO-neg) may be automatically set at, or slightly beyond, its corresponding noise threshold. Alternatively, the noise threshold can be regarded as the representative value to be used for Tcomp (or Tcomp-neg), and a dynamic value of TminO (and/or its opposite polarity counterpart TminO-neg) may be automatically set at, or slightly beyond Tcomp (or Tcomp-neg). Of course a fixed value calibrated at a factory, or entered by a user, or established by a field calibration or recalibration procedure may also be used for Tcomp (or Tcomp-neg) in various other embodiments or operating modes of the force caliper, rather than a dynamic value as outlined above.

It will be appreciated that pre-contact motion direction reversals will produce a force change that jumps between the "B-C" data force level and the "H-J" data force level without a significant change in position. The signal processing electronics may include a routine that detects this condition, in order to begin and end the determination of Tcomp or Tcomp-neg with appropriate data points. In some embodiments and/or operating modes, the signal processing electronics may update Tcomp or Tcomp-neg automatically. Of course, in some embodiments and/or operating modes, the signal processing electronics may set Tcomp or Tcomp-neg at a fixed level determined at the factory, or by a user, or based on a single field calibration.

In any case, it will be appreciated that Tcomp (or Tcomp-neg) is a force component that is independent of the measuring force, in that it is present in the absence of contact with the workpiece and doesn't change as the measuring force against the workpiece is increased. Thus, in order to set one or more measurement force thresholds (e.g. acceptable force range limits) related to the actual force applied to the workpiece, it is desirable to estimate the independent force component Tcomp (and/or Tcomp-neg) and, in some embodiments the associated noise, and set such force limits relative to these "compensation forces". Stated another way, these "compensation forces" that are not dependent on variations in the amount of force applied to a workpiece by a user may be used to set force measurement thresholds in order to govern the measurement force component actually applied to the workpiece and indicate its associated acceptable force range for dimension measurements.

Regarding the lower acceptable force limit TminO, it is desirable to set it relative to Tcomp in various embodiments. For example, as outlined above, in some embodiments it may be desirable to set TminO slightly beyond Tcomp and/or at or slightly beyond a "friction force noise" margin, if the friction noise is significant. This may be particularly desirable for relatively more compliant workpieces, as it will correspond to relatively low workpiece deformation and/or creep. For relatively stiff workpieces (e.g. metal blocks) it may be desirable to set TminO significantly beyond Tcomp and/or the "friction force noise" margin, since workpiece deformation and repeatability will not be compromised in this case, and setting TminO with a wider margin from the independent force components may allow a better user experience in terms of aligning the workpiece more easily or robustly against the caliper jaws without unnecessarily sensitive force range indications, or the like.

For very compliant workpieces, it may be desirable for the caliper to include additional operations, modes and/or routines and/or features related to the acceptable measuring force range and a valid workpiece measurement. For very compliant workpieces, setting TminO with even a small margin above Tcomp may result in significant workpiece deflection (e.g. for a thin walled plastic tube) at TminO. Or, in another case, very compliant workpiece measurement repeatability at TminO may be poor due to "random" variation in the friction force component of the force signal (friction "noise"), which causes the force actually applied to the workpiece at TminO (and other force levels) and the resultant workpiece deflection to vary corresponding to that "friction noise". This situation can be improved by including a "super soft" workpiece mode or signal processing routine which computes a representative measurement based on some of the data outlined above. As previously indicated, the caliper may include a "spring rate" determination routine that analyzes data "above TminO" wherein the force and position have a consistent relationship of force and position change and determine a spring rate. For example, a best fit force/displacement line may be determined based on several data points, with a slope that is the spring rate. Also, as previously indicated, Tcomp may be determined based on a plurality of data points. It will be appreciated that in the ideal case the point on the best fit force/displacement line corresponding to Tcomp is where the workpiece is just contacted, but with approximately zero force applied to the workpiece such that it is undeflected. This approximates its true dimension. Because Tcomp and the best fit force/displacement line are both based on multiple data points, the repeatability of the "zero force" measurement on the best fit force/displacement line is enhanced relative to a single measurement at TminO, or the like. Therefore, in some embodiments, data may be collected in the acceptable measurement force range, which may be and expanded or predetermined fixed range for the purposes of this operating mode and/or routine, and processing as outlined above (or based on similar principles) may be carried out. The "zero force" measurement may then be retrieved and/or displayed by a user based on a corresponding operating mode, or retrieval operations (e.g. pushing a corresponding button or button sequence on the caliper), or the like. Of course, in various embodiments, the caliper may be configured to allow the user to enter or define another force level to be used to retrieve a representative soft workpiece measurement, rather than a zero force level (corresponding to Tcomp), if desired.

The description above refers to the force/displacement curves around the points C-H, which are related to an increasing force and position measurement, which corresponds to opening the caliper and measuring an "internal" dimension on a workpiece. It will be appreciated that analogous force/displacement curves which are related to an increasing opposite polarity force ("−" force in FIG. 5) and decreasing position measurements, which corresponds to closing the caliper and measuring an "external" dimension on a workpiece would appear similar to the data between points C and H, but rotated 180 degrees with point C coinciding with the line between points H and J. It will be understood that the various principles and behaviors and routines outlined above may be suitably adapted to provide analogous operations for closing the caliper and measuring an "external" dimension on a workpiece. It will be understood that TminO-neg may be set according to considerations analogous to those described for TminO, and so on for other analogous thresholds and values.

Figure 6:
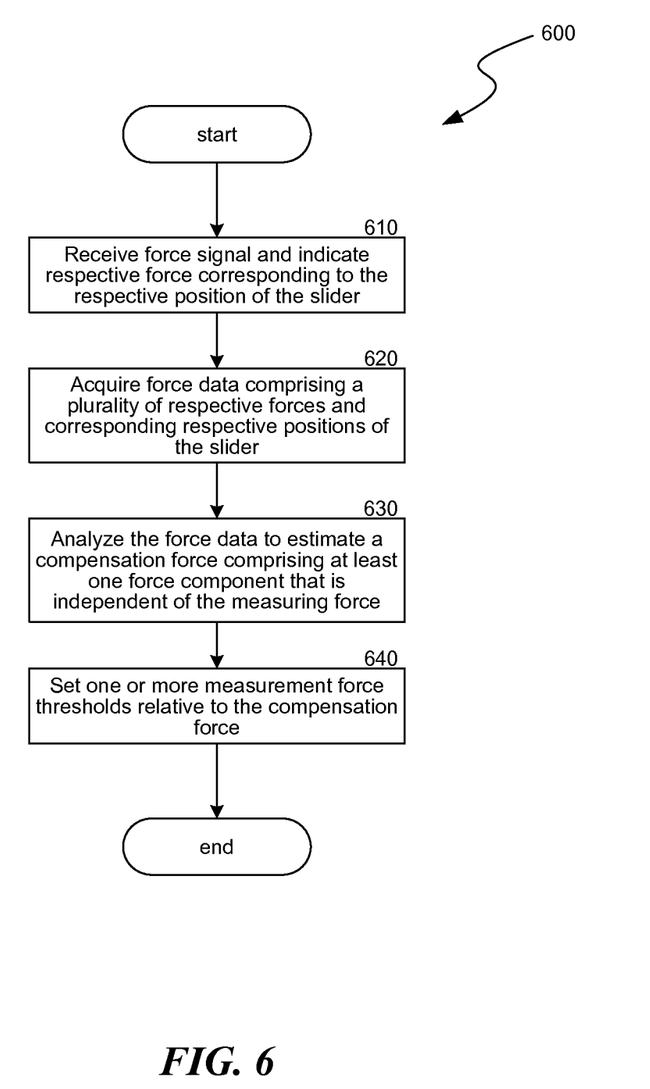
FIG. 6 is a flow diagram illustrating one exemplary embodiment of a general routine for setting one or more measurement force thresholds.

FIG. 6 is a flow diagram illustrating one exemplary embodiment of a general routine 600 for setting one or more measurement force thresholds. At a block 610, a force signal is received and a respective force is indicated corresponding to a respective position of a slider. At a block 620, force data is acquired comprising a plurality of respective forces corresponding to respective positions of the slider. At a block 630, the force data is analyzed to estimate a compensation force comprising at least one force component that is independent of the measuring force (e.g. by analyzing pre-contact data, as outlined previously with reference to FIG. 5.) At a block 640, the one or more measurement force thresholds are set relative to the compensation force.

It will be appreciated that, by acquiring the force measurement readings as described above with respect to FIG. 6, increased measurement accuracy may be achieved. One aspect that may be addressed by such techniques is that the sliding force of the caliper (e.g., as indicated by the compensation force Tcomp of FIG. 5) may generally vary over time (e.g due to regular use or being changed by a user.) In such a case, any factory-set minimum/maximum force thresholds will no longer represent a correct force component needed to correct an indicated workpiece measurement force. By acquiring the force measurement readings and setting the thresholds as described above (either as a new calibration, or dynamically with each measurement procedure), more accurate measurements are produced in circumstances where forces may have changed and/or workpieces with different levels of compliance are being measured.

A force measuring assembly described herein includes a strain measuring assembly and a force actuator assembly. It will be appreciated that other types of force sensors are compatible with a number of the features disclosed herein, and may be arranged to sense a force exerted by a user through the case, or a simpler thumbwheel assembly, or the like. The strain measuring and/or force actuator assemblies disclosed herein may be advantageous ergonomically, but are not required in all contemplated embodiments. Thus, it should be appreciated that unless precluded by a configuration itself, various teachings regarding force application, and signal processing and routines, and the like may be applied to such configurations and all or some of the features disclosed herein may be combined in various embodiments and many of the attendant features and benefits outlined herein will be retained.

From the foregoing, it will be appreciated that specific embodiments of the invention have been described herein for purposes of illustration, but that various modifications may be made without deviating from the scope of the invention. Those skilled in the art will appreciate that the operations and routines depicted in flow chart steps and otherwise described herein may be altered in a variety of ways. More specifically, the order of the steps may be re-arranged, steps may be performed in parallel, steps may be omitted, other steps may be included, various combinations or omissions of routines may be made, etc. Accordingly, the invention is not limited except as by the appended claims.

We claim:

1. An electrically powered caliper, comprising:
   a scale member including a first measuring surface to be located against a workpiece during a measurement;
   a slider including a second measuring surface to be located against a workpiece during a measurement;
   a displacement sensor configured to provide a position signal responsive to changes in a position of the slider along the scale member;
   a force sensing arrangement located on the slider and configured to provide a force signal responsive to changes in a measurement force exerted on a workpiece by a user through at least one of the first and second measuring surfaces during a measurement procedure;
   a signal processing portion configured to receive the position signal and indicate a respective position of the slider along the scale member, the signal processing portion including at least a first operating mode wherein it is configured to:
     receive a force signal and determine a respective force corresponding to the respective position of the slider;
     acquire force data comprising a plurality of respective forces and corresponding respective positions of the slider; and
     define an acceptable measurement force range defined by at least a minimum force threshold that is determined such that it exceeds a compensation force corresponding to at least one force component included in the force signal that is independent of user variations of the measurement force.

2. The caliper of claim 1, wherein the minimum force threshold is a static threshold based on force calibration data stored in the caliper during one of factory assembly and a field calibration procedure comprising acquiring force data while the user moves the slider without exerting force on a workpiece.

3. The caliper of claim 2, wherein the force calibration data is stored during the field calibration procedure and the signal processing portion is configured to analyze the force data acquired while the user moves the slider to determine and set the minimum force threshold based on the analyzed force data.

4. The caliper of claim 3, wherein the signal processing portion is configured to determine a compensation force based on the analyzed force data, and set the minimum force threshold based on that compensation force.

5. The caliper of claim 1, wherein the minimum force threshold is a dynamic threshold and the signal processing portion is configured to analyze the acquired force data during a current measurement procedure to identify pre-contact data, and set the minimum force threshold for the current measurement procedure based on that pre-contact data.

6. The caliper of claim 4, wherein the signal processing portion is configured to determine a current compensation force based on the pre-contact data, and set the minimum force threshold based on the current compensation force.

7. The caliper of claim 1, wherein the signal processing portion is configured to:
   define a first acceptable measurement force range for exterior measurements defined by at least a first minimum force threshold that is determined such that it exceeds a first compensation force corresponding to at least one force component included in the force signal that is independent of user variations of the measurement force when a user makes an exterior measurement; and
   define a second acceptable measurement force range for interior measurements defined by at least a second minimum force threshold that is determined such that it exceeds a second compensation force corresponding to at least one force component included in the force signal that is independent of user variations of the measurement force when a user makes an interior measurement.

8. The caliper of claim 1, wherein the acceptable measurement force range is further defined by a maximum force threshold.

9. The caliper of claim 8, wherein the maximum force threshold is a static threshold.

10. The caliper of claim 8, wherein the signal processing portion is configured to define the maximum force threshold relative to the minimum force threshold.

11. The caliper of claim 8, wherein the signal processing portion is configured such that in the first operating mode it analyzes the acquired force data during a current measurement procedure, and dynamically defines the maximum force threshold of the current measurement procedure closer to the minimum force threshold for relatively more compliant workpieces and farther from the minimum force threshold for relatively stiffer workpieces.

12. The caliper of claim 11, wherein the signal processing portion is configured such that in the first operating mode it analyzes the acquired force data during a current measurement procedure to characterize a workpiece spring rate and defines the maximum force threshold of the current measurement procedure relative to the minimum force threshold based on the characterized workpiece spring rate.

13. The caliper of claim 1, further comprising a force actuator located on the slider, the force actuator comprising a force spring rate spring having a dimension that is altered by a user to vary the measurement force.

14. The caliper of claim 13, wherein the force spring rate spring has a spring rate of at most 6 N/mm and at least 0.25 N/mm.

15. The caliper of claim 13, wherein the force sensing arrangement comprises a deformable member and a strain sensor that senses a deformation of the deformable member, and the force actuator and the force sensing arrangement are configured such that the deformation corresponds to the altered dimension of the force spring rate spring.

16. The caliper of claim 1, further comprising a force status indicator controlled by the signal processing portion, wherein the signal processing portion is configured to analyze the acquired force data during a current measurement procedure in order to control the force status indicator, and a first state of the force status indicator indicates that a current respective measurement force must be increased to be within the acceptable measurement force range, and a second state of the force status indicator indicates that a current respective measurement force is within the acceptable measurement force range and a current respective indicated position of the slider is a valid workpiece measurement according to criteria used by the signal processing portion.

17. The caliper of claim 16, wherein the acceptable measurement force range is further defined by a maximum force threshold, and an excessive force state of the force status indicator that is distinct from the first and second states indicates that a current respective measurement force exceeds the acceptable measurement force range and must be decreased to be within the acceptable measurement force range.

18. The caliper of claim 17, wherein the criteria used by the signal processing portion to control the state of the force status indicator includes a force reversal criteria, and when the analysis of the acquired force data indicates a force reversal has occurred according to the criteria, then a force reversal state of the force status indicator that is distinct from the first and second states and indicative that a current respective indicated position of the slider is not valid workpiece measurement persists until at least one of force altering operations and position altering operations are performed by the user to deactivate the force reversal state.

19. The caliper of claim 18, wherein the signal processing portion is configured to use a display of the caliper to display user prompts to guide the user in performing the at least one of force altering operations and position altering operations needed to deactivate the force reversal state.

20. The caliper of claim 19, wherein the first state of the force status indicator comprises no indicator light on, the second state of the force status indicator comprises an indicator light of a first color, the excessive force state of the force status indicator comprises an indicator light of a second color, and the force reversal state of the force status indicator comprises an indicator light that is blinking.

21. The caliper of claim 1, wherein the at least one force component comprises a slider frictional force component which depends on the friction of the slider on the scale member.

22. The caliper of claim 1, wherein the at least one force component comprises a gravitational force component which depends on the orientation of the caliper and the mass of a slider assembly that moves with the slider.

23. The caliper of claim 22, further comprising an accelerometer, wherein an output from the accelerometer is utilized by the signal processing portion in a determination of the gravitational force component.

\* \* \* \* \*